United States Patent
Evans

(10) Patent No.: US 8,236,217 B2
(45) Date of Patent: Aug. 7, 2012

(54) PRESTRESSING FIXTURE TO ELIMINATE AUTOMOTIVE P.S.I.R. DOOR-CHUTE VIBRATION WELD VISIBILITY

(75) Inventor: Gregg S. Evans, Windsor (CA)

(73) Assignee: Intertec Systems L.L.C., Plymouth, MI (US)

( * ) Notice: Subject to any disclaimer, the term of this patent is extended or adjusted under 35 U.S.C. 154(b) by 11 days.

(21) Appl. No.: 12/946,432

(22) Filed: Nov. 15, 2010

(65) Prior Publication Data

US 2011/0056611 A1   Mar. 10, 2011

Related U.S. Application Data

(63) Continuation of application No. 11/952,503, filed on Dec. 7, 2007, now abandoned.

(60) Provisional application No. 60/873,274, filed on Dec. 7, 2006.

(51) Int. Cl.
*B29C 65/06* (2006.01)

(52) U.S. Cl. .................... 264/248; 264/407; 425/388

(58) Field of Classification Search .................. 264/248, 264/407; 425/388
See application file for complete search history.

(56) References Cited

U.S. PATENT DOCUMENTS

| 4,836,765 | A | 6/1989 | Kornitzky et al. |
| 6,056,531 | A | 5/2000 | Furuya et al. |
| 6,131,945 | A | 10/2000 | Labrie et al. |
| 6,595,543 | B2 * | 7/2003 | Desprez ..................... 280/728.3 |
| 2003/0012839 | A1 * | 1/2003 | Evans et al. ................ 425/174.4 |
| 2005/0040569 | A1 | 2/2005 | Fitzell, Jr. |
| 2005/0140059 | A1 | 6/2005 | Ernst et al. |

* cited by examiner

*Primary Examiner* — Maria Veronica Ewald
*Assistant Examiner* — Robert J Grun
(74) *Attorney, Agent, or Firm* — Dykema Gossett PLLC

(57) ABSTRACT

A method of manufacturing an automotive instrument panel for eliminating distortion in an area of vibration welded air bags comprises: providing a weld fixture including at least one pre-stressor protrusion; placing the at least one pre-stressor protrusion against an instrument panel; generating a force to press the weld fixture against the instrument panel to create compression in a first surface of the instrument panel where the weld fixture contacts the instrument panel and to create tension in a second surface of the instrument panel, the second surface opposite to the first surface; and vibration welding an air bag chute to the instrument panel such that a weld bar of the air bag chute is welded to the second surface of the instrument panel.

19 Claims, 3 Drawing Sheets

PRESTRESSING FIXTURE TO ELIMINATE AUTOMOTIVE P.S.I.R. DOOR-CHUTE VIBRATION WELD VISIBILITY

RELATED APPLICATIONS

This application is a continuation of U.S. patent application Ser. No. 11/952,503, filed Dec. 7, 2007 (the '503 application), now pending, which claims the benefit of U.S. Provisional Patent Application Ser. No. 60/873,274, filed Dec. 7, 2006 (the '274 application). The '503 application and the '274 application are both hereby incorporated by reference in their entireties as though fully set forth herein.

BACKGROUND OF INVENTION a. Field of Invention

The invention relates generally to automotive instrument panels, an apparatus for and method of manufacture thereof, and, more particularly, to an apparatus for and method of manufacturing automotive instrument panels and other automotive components which eliminates distortion in the area of vibration welded Passenger Side Inflatable Restraint (PSIR) chutes and other vibration welded components.

b. Description of Related Art

Automobiles are commonly equipped with airbags for reducing driver and passenger injuries in the case of an accident. Automobile airbags are generally located in areas where a driver or passenger would potentially contact an automobile interior in the event of an accident. Airbags can reduce injuries by providing a substantially non-solid surface for the driver or passenger to contact, as opposed to the generally solid surfaces of the automotive interior. Although the functionality of the airbag is greatly valued, the visual appeal of the instrument panel, and invisibility of the airbag system are also of value to automobile manufacturers and consumers alike.

In order to install an airbag, the airbag is generally folded into a module that is installed into or behind an automotive interior component. The module housing a passenger-side airbag is generally installed on the underside of an instrument panel, within a PSIR chute protruding behind the instrument panel. The instrument panel will generally have a pre-weakened area, allowing an airbag to release therethrough. A PSIR chute will be bonded to the instrument panel, and will generally include doors that line up with the pre-weakened area of the instrument panel.

A known method for attaching a PSIR chute to an instrument panel includes vibration welding the PSIR chute to the instrument panel. Vibration welding joins components by "rubbing" them together, creating heat through the friction, melting the connection points, and applying/holding pressure until the components cool together, thereby welding the components at the contact points. During the cooling process, there is known to be shrinkage/deformation of materials. Namely, during the known vibration welding of an instrument panel and PSIR chute, there is a visible deflection of the instrument panel at the connection points between the components caused by uneven shrinkage during the cooling process.

It would therefore be of benefit to provide an apparatus and method of manufacturing automotive instrument panels and other structures including air bags and other vibration welded components to include a flat (or predetermined contoured) appearance in the area of the vibration welds.

SUMMARY OF THE INVENTION

The present invention overcomes the drawbacks and deficiencies of known methods and apparatus for attaching a PSIR chute to an instrument panel by providing an automotive interior component including an airbag chute having one or more weld bars and a pre-stressed instrument panel having a substrate layer for bonding to the weld bar. For the instrument panel, tensile stress at weld bar bonding areas reduces any deformation visible on an exposed surface of the pre-stressed instrument panel, by matching the "B" surface stretch under the tensile stress of local bending to the expected shrink of the melted layer.

For the automotive interior component described above, the weld bars of the airbag chute may be vibration welded to the "B" side of the plastic instrument panel. The interior component may further include a cover layer bonded to the substrate layer. The cover layer may be made of polyvinyl chloride or ThermoPlastic Olefin, and in an exemplary embodiment, may have a thickness of 0.4-1.0 mm. The interior component may further include a cover layer and an intermediate foam layer bonded to the substrate layer. The foam layer may be made of polypropylene, and in an exemplary embodiment, may have a thickness of 0.5-3.0 mm. The substrate layer may include thermoplastic polymers, and in an exemplary embodiment, may have a thickness of 2.0-4.0 mm.

The invention also provides an apparatus for pre-stressing an automotive instrument panel for eliminating distortion in an area of vibration welded airbag chutes. The apparatus may include a weld fixture including a plurality of convex pre-stressors disposable against an instrument panel for creating compression in an area of contact with an instrument panel and creating tension in a surface opposite the contact area upon application of vacuum to draw the instrument panel toward the weld fixture. The weld fixture may be disposable against a cover layer of the instrument panel and creates tension in a substrate layer of the instrument panel, with the substrate layer being disposed adjacent an opposite face of the cover layer with or without an intermediate foam layer being disposed between the cover and substrate layers.

The invention yet further provides a method of manufacturing an automotive instrument panel for eliminating distortion in an area of vibration welded air bags. The method may include providing a weld fixture including at least one pre-stressor protrusions, and placing the at least one pre-stressor protrusion against an instrument panel. The method may also include generating a force to press the weld fixture against the instrument panel to create compression in a first surface of the instrument panel where the weld fixture contacts the instrument panel and to create tension in a second surface of the instrument panel, the second surface opposite to the first surface, and vibration welding an air bag chute to the instrument panel such that a weld bar of the air bag chute is welded to the second surface of the instrument panel.

In another embodiment, a method of manufacturing an automotive instrument panel may include providing a weld fixture including a plurality of pre-stressor protrusions and placing at least one of the plurality of pre-stressor protrusions against a first surface of an instrument panel. The method may also include pressing the weld fixture against the instrument panel, thereby creating compression in the first surface of the instrument panel and creating tension in a second surface of the instrument panel, wherein the second surface is opposite to the first surface. The method may also include vibration welding a weld bar to the second surface of the instrument panel and cooling the instrument panel.

For the methods described above, the instrument panel may also include a substrate layer, a foam layer attached to the substrate layer, and a cover layer attached to the foam layer. For the method described above, placing the pre-stressor protrusions includes placing the pre-stressor protrusions against the cover layer of the instrument panel, and vibration welding further includes vibration welding an air bag chute to the substrate layer. For example, the method of manufacturing an automotive instrument panel may include providing a weld fixture including a plurality of pre-stressor protrusions and providing an instrument panel. The instrument panel may include a first layer and a second layer. The method may further include placing at least one of the plurality of pre-stressor protrusions against the first layer of the instrument panel and pressing the weld fixture against the instrument panel, thereby creating compression in the first layer of the instrument panel and creating tension in the second layer of the instrument panel. The method may further include vibration welding a weld bar to the second layer of the instrument panel and cooling the instrument panel. The first layer may comprise a substrate layer, and the second layer may comprise a cover layer in an embodiment of the invention. In another embodiment, the first layer may comprise a cover layer and the second layer may comprise a substrate layer. In some embodiments, a third layer (e.g., a foam layer) may be disposed between the first and second layers.

Additional features, advantages, and embodiments of the invention may be set forth or become apparent from consideration of the following detailed description, drawings, and claims. Moreover, it is to be understood that both the foregoing summary of the invention and the following detailed description are exemplary and intended to provide explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENT

Figure 1:
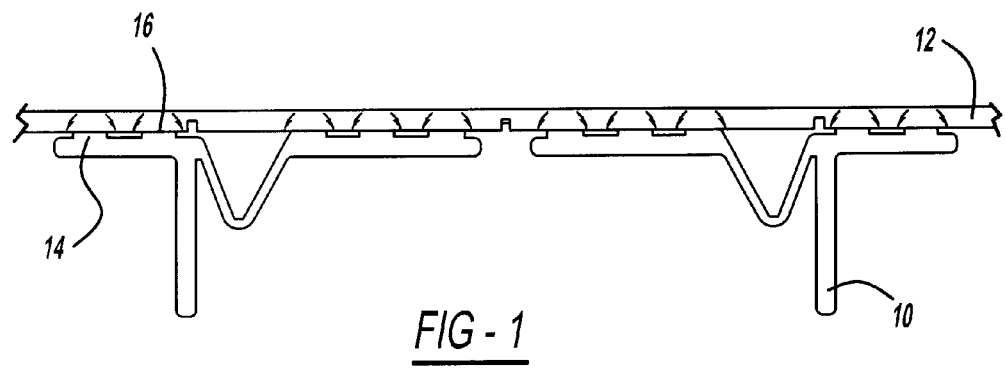
FIG. 1 is a view illustrative of a related art instrument panel and PSIR chute, after vibration welding of the PSIR chute to the instrument panel, using arrows to show the bending induced by the melt shrink.
Figure 2A:
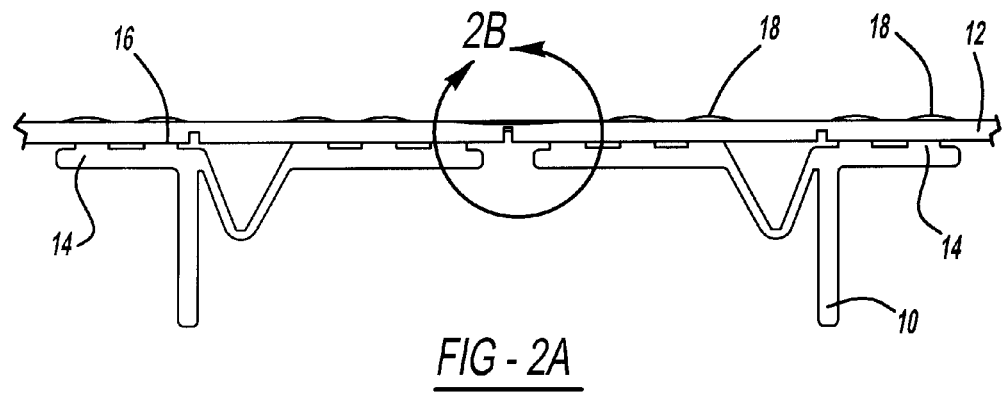
FIG. 2A is a view illustrative of the related art instrument panel construction of FIG. 1, illustrating various distortions in the instrument panel visible surface due to vibration welding of the PSIR chute.
Figure 2B:
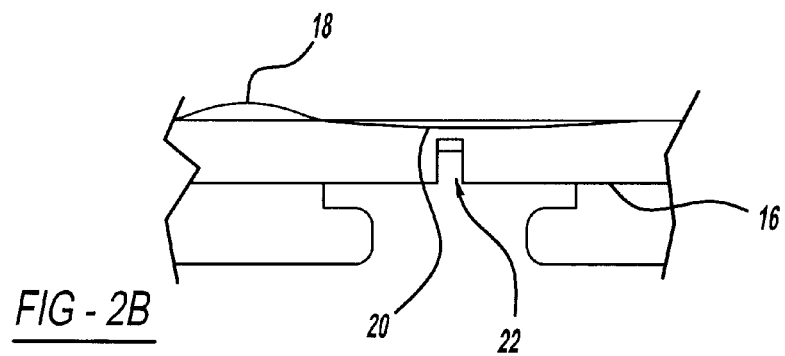
FIG. 2B is an enlarged view of the related art instrument panel construction of FIG. 1, illustrating distortion in the area of the center score weakening line.
Figure 3:
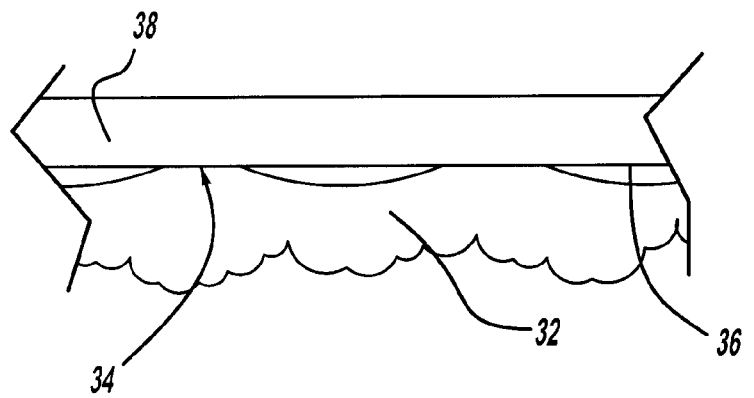
FIG. 3 is a view illustrative of a modified weld fixture surface for pre-stressing of the instrument panel according to the present invention.
Figure 4:
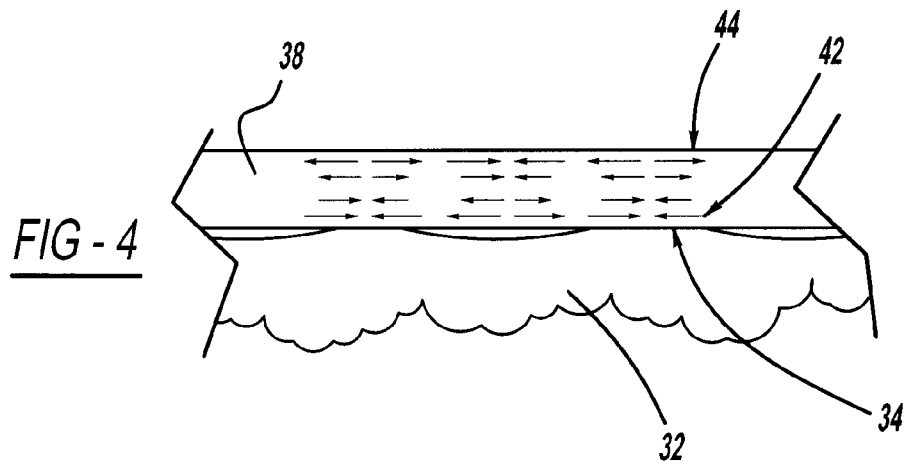
FIG. 4 is a view illustrating pre-stressing of the instrument panel according to the present invention.
Figure 5:
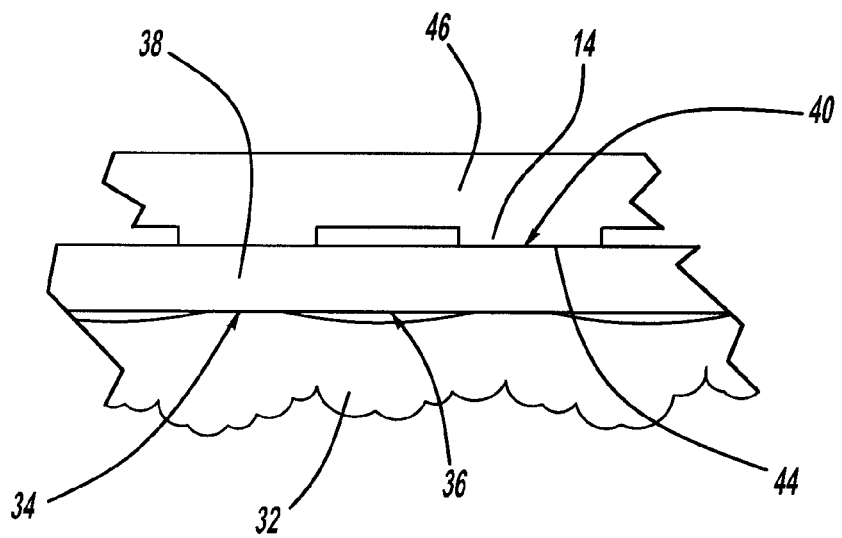
FIG. 5 is a view illustrating vibration welded attachment of a PSIR chute.
Figure 6A:
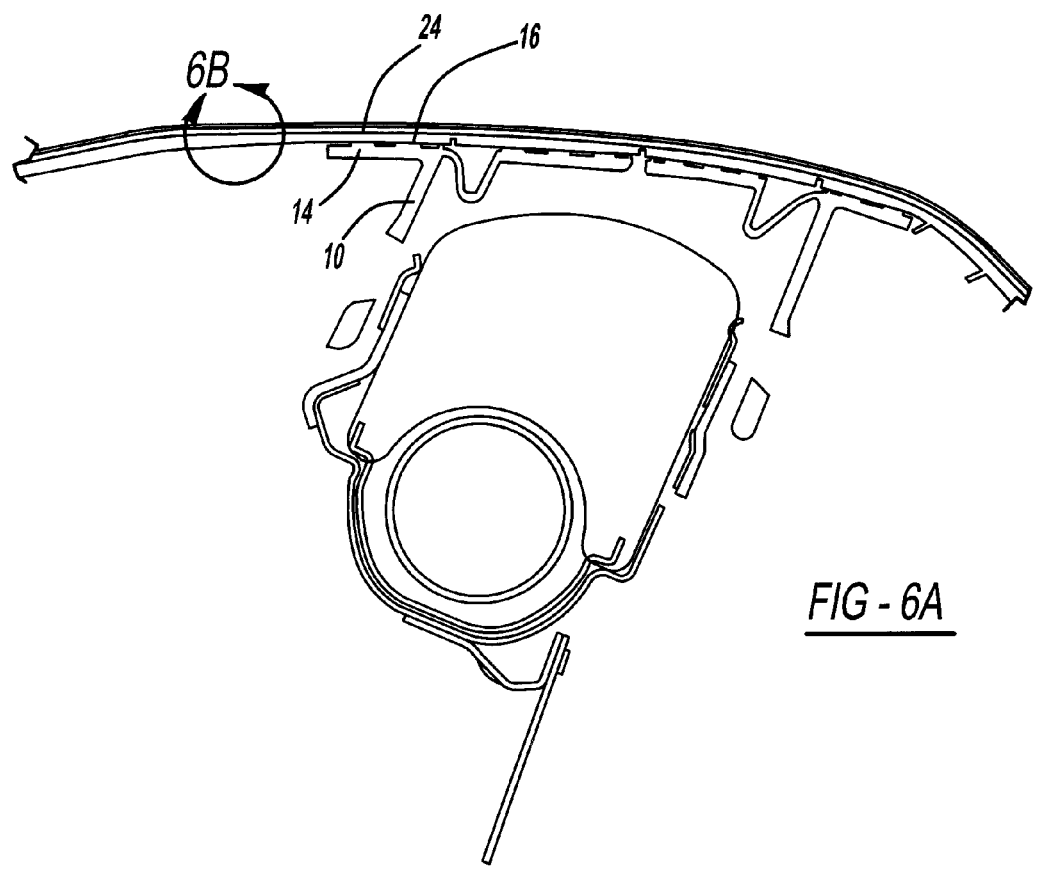
FIG. 6A is a view illustrative of a pre-stress layered instrument panel according to the present invention, illustrating a PSIR chute vibration welded thereon.
Figure 6B:
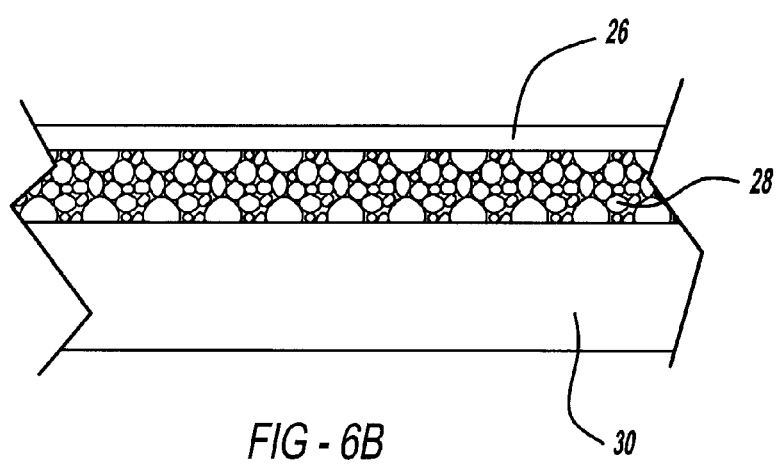
FIG. 6B is an enlarged view of the pre-stressed layered instrument panel of FIG. 6A for absorbing any distortions from vibration welding of the PSIR chute.

Referring now to the drawings wherein like reference numerals designate corresponding parts throughout the several views, FIGS. 1-2B are views illustrative of a related art instrument panel construction, FIGS. 3-5 are views illustrative of an instrument panel construction for eliminating distortion in the area of vibration welded PSIR chutes according to the present invention, and FIGS. 6A and 6B are views illustrative of a pre-stressed layered instrument panel according to the present invention.

Referring to FIG. 1, in "hard hidden" constructions, a PSIR Chute 10 is often vibration welded to the underside of prior art instrument panel 12. As briefly discussed above, the technique of vibration welding generally involves the physical movement of PSIR Chute 10 having weld bars 14 relative to prior art instrument panel 12, with weld bars 14 being moved horizontally relative to instrument panel 12 under pressure. This physical movement creates heat which melts contact area 16 of prior art instrument panel 12, and thus allows weld bars 14 to be welded to prior art instrument panel 12 upon cooling of areas 16 when the relative movement is stopped.

Referring to FIGS. 2A and 2B, upon cooling, the thermal shrinkage in contact areas 16 causes compression in areas 16 and tension in the opposite visible areas 18 of the prior art instrument panel. Further, the thermal shrinkage in contact areas 16 also causes bending in area 20 of center score line 22. Referring back to FIG. 1, the bending induced by the melt shrink is shown generally by the arrows.

Referring to FIG. 3, the present invention generally provides an instrument panel construction technique using a modified weld fixture 32 (illustrated as a lower weld fixture in FIG. 3) including a plurality of spaced convex pre-stressors 34. In the embodiment illustrated, each pre-stressor 34 may be a smooth convex curved shape, however protrusions of various configurations may be used to transfer the desired force to the instrument panel. Referring to FIGS. 3-5, each pre-stressor 34 may be disposed adjacent visible surface 36 of instrument panel 38 and is further disposed opposite weld bars 14. Referring to FIG. 3, each pre-stressor 34 may include a predetermined height to bend instrument panel 38 such that the tension induced stretch on the back surface 40 matches the expected weld shrink to thus eliminate distortion in the area of weld bars 14. Where the technique is used on a pre-stressed layered instrument panel (as discussed below), pre-stressors 34 may be disposed adjacent to a cover layer and tension may be on substrate layer 30 (refer to FIG. 6B). Modified weld fixture 32 may further include a plurality of holes (not shown) for creating compression in areas 42 and tension in areas 44 of instrument panel 38 upon the application of a vacuum to draw instrument panel 38 toward fixture 32. A vacuum seal (not shown) may be provided around instrument panel 38 for creating a vacuum as discussed above. Although a vacuum force is described herein, those skilled in the art would appreciate the application of similar forces to the modified weld fixture 32 and instrument panel 38. Namely, instead of using vacuum to draw instrument panel 38 toward weld fixture 32, weld fixture 32 (and another upper weld fixture (not shown) for holding the air bag chute) may be simply pressed against instrument panel 38 (and air bag chute 46) to thus create the aforementioned compressed/tensioned areas.

The manufacturing method of instrument panel 38 according to the present invention will now be described in detail with reference to FIGS. 3-5. As shown in FIG. 3 and briefly discussed above, instrument panel 38 may be disposed relative to modified weld fixture 32, with visible surface 36 of instrument panel 38, or the surface of substrate layer 30 adjacent foam layer 28 of pre-stressed layered instrument panel 24 as shown in FIG. 6B (see discussion below), being disposed in contact with pre-stressors 34 of weld fixture 32. The instrument panels may be laterally aligned relative to weld fixture 32 such that each pre-stressor 34 is disposed opposite the weld bars 14. A vacuum may then be created to draw instrument panel 38 (or 24 of FIGS. 6A and 6B) towards weld fixture 32 via the holes (not shown) in weld fixture 32. In an exemplary embodiment of the present invention, the vacuum may be generated at 13 psi, with the instrument panel being maintained at room temperature. Further, in an exemplary embodiment, weld fixture 32 (and the weld fixture for air bag chute 46) may be machined aluminum and include a thin (i.e. ⅓ mm) urethane layer to prevent scratching or damage to the grain of instrument panel 38 (or 24 of FIGS. 6A and 6B).

Referring to FIG. 4, after vacuum application, instrument panel 38 (or 24 of FIGS. 6A and 6B) may include compression in areas 42 and tension in areas 44 to thus create an uneven instrument panel visible surface prior to vibration welding of air bag chute 46.

Referring next to FIG. 5, with weld fixture 32 held in place relative to instrument panel 38 (or 24 of FIGS. 6A and 6B), air bag chute 46 including weld bars 14 (and another upper weld fixture (not shown) for holding the air bag chute) may be vibration welded to instrument panel 38. Upon cooling of weld areas 44, the initial stretch due to tension in areas 44 (see FIG. 4) is matched by the thermal shrinkage created by cooling of weld areas 44 to thus create a horizontal (or otherwise predetermined contoured) instrument panel visible surface 36 without distortion.

Referring now to FIGS. 6A and 6B, as briefly discussed above, in an alternative embodiment of the instrument panel, PSIR Chute 10 having weld bars 14 may be vibration welded to pre-stressed layered instrument panel 24 at contact areas 16. As shown in FIG. 6B, pre-stressed layered instrument panel 24 may include cover layer 26, which may be about 0.4-1.0 mm of polyvinyl chloride, ThermoPlastic Olefin, a blend of polypropylene, polyethylene and/or rubber, or like thermoplastic polymers. Panel 24 may further include a foam layer 28 including polypropylene foam or like material of about 0.5-3.0 mm thickness, and a substrate layer of 30 of 2.0-4.0 mm thick ThermoPlastic Olefin or like material. Substrate layer 30 may be formed by an injection molding process. Cover layer 26 and foam layer 28 may be vacuum wrapped over the substrate layer 30. Weld bars 14 may be vibration molded at contact areas 16 to substrate layer 30.

Whereas visible distortion in areas 18 and center area 20 appear in the related art (see FIGS. 2A and 2B), distortions are not visible through the pre-stressed layered instrument panel 24, as the press-stressed combination of substrate layer 30, foam layer 28, and cover layer 26 act to absorb any distortion caused by vibration welding. Whereas the embodiment of pre-stressed layered instrument panel 24 has been described as being formed by placement of convex pre-stressors 34 adjacent the surface of substrate layer 30 adjacent foam layer 28, it is conceivable that pre-stressors 34 may be placed on the exposed surface of cover layer 26.

Those skilled in the art would readily appreciate in view of this disclosure that various modifications may be made to the instrument panel construction technique described above, without departing from the scope of the present invention. For example, while instrument panel construction technique has generally been discussed in conjunction with vibration welded assembly of air bags, this technique may be readily used with other vibration welded components for eliminating distortion in the area of the vibration weld. Further, while the use of pre-stressors 34 has been discussed for eliminating distortion in an instrument panel, pre-stressors 34 may be also used as needed to create a predetermined contoured appearance in the area of an instrument panel or other structures for providing a desirable contoured aesthetic appearance.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method of manufacturing an automotive instrument panel for eliminating distortion in an area of vibration welded air bags, said method comprising:
   providing a weld fixture including at least one pre-stressor protrusion;
   placing the at least one pre-stressor protrusion against an instrument panel;
   generating a force to press the weld fixture against the instrument panel to create compression in a first surface of the instrument panel where the weld fixture contacts the instrument panel and to create tension in a second surface of the instrument panel, the second surface opposite to the first surface; and
   vibration welding an air bag chute to the instrument panel such that a weld bar of the air bag chute is welded to the second surface of the instrument panel.

2. A method according to claim 1, wherein the instrument panel comprises:
   a substrate layer,
   a foam layer connected to the substrate layer, and
   a cover layer connected to the foam layer, wherein placing the at least one pre-stressor protrusion includes placing the at least one pre-stressor protrusion against the cover layer of the instrument panel, and wherein vibration welding further comprises vibration welding the air bag chute to the substrate layer.

3. A method according to claim 1, wherein the at least one pre-stressor protrusion is convex in shape.

4. A method according to claim 1, wherein the at least one pre-stressor protrusion comprises a smooth curved shape.

5. A method according to claim 1, wherein the weld fixture comprises a plurality of pre-stressor protrusions.

6. A method according to claim 5, wherein each of the plurality of pre-stressor protrusions is convex in shape.

7. A method according to claim 5, wherein each of the plurality of pre-stressor protrusions comprises a smooth curved shape.

8. A method according to claim 5, wherein each of the plurality of pre-stressor protrusions are substantially aligned along a surface of the weld fixture.

9. A method according to claim 1, wherein the weld fixture further includes at least one hole, and wherein generating a force to press the weld fixture against the instrument panel comprises creating a vacuum.

10. A method according to claim 1, further comprising: cooling the instrument panel.

11. A method according to claim 10, wherein the second surface of the instrument panel is subject to thermal shrinkage that is substantially equal to the tension created in the second surface of the instrument panel.

12. A method according to claim 11, wherein the first surface of the instrument panel is substantially flat after cooling the instrument panel such that the first surface of the instrumental panel has a shape that is different from the shape of the at least one pre-stressor protrusion.

13. A method of manufacturing an automotive instrument panel, said method comprising:

providing a weld fixture including a plurality of pre-stressor protrusions;
placing at least one of the plurality of pre-stressor protrusions against a first surface of an instrument panel;
pressing the weld fixture against the instrument panel, thereby creating compression in the first surface of the instrument panel and creating tension in a second surface of the instrument panel, wherein the second surface is opposite to the first surface;
vibration welding a weld bar to the second surface of the instrument panel; and
cooling the instrument panel.

14. A method according to claim 13, wherein the second surface of the instrument panel is subject to thermal shrinkage that is substantially equal to the tension created in the second surface of the instrument panel.

15. A method according to claim 13, wherein each of the plurality of pre-stressor protrusions is convex in shape.

16. A method of manufacturing an automotive instrument panel, said method comprising:
providing a weld fixture including a plurality of pre-stressor protrusions;
providing an instrument panel including:
 a first layer; and
 a second layer;
placing at least one of the plurality of pre-stressor protrusions against the first layer of the instrument panel;
pressing the weld fixture against the instrument panel, thereby creating compression in the first layer of the instrument panel and creating tension in the second layer of the instrument panel;
vibration welding a weld bar to the second layer of the instrument panel; and
cooling the instrument panel.

17. A method according to claim 16, wherein the instrument panel further comprises a third layer disposed between the first layer and the second layer.

18. A method according to claim 17, wherein the third layer comprises a foam layer.

19. A method according to claim 16, wherein each of the plurality of pre-stressor protrusions is convex in shape.

* * * * *